Patented Nov. 19, 1946

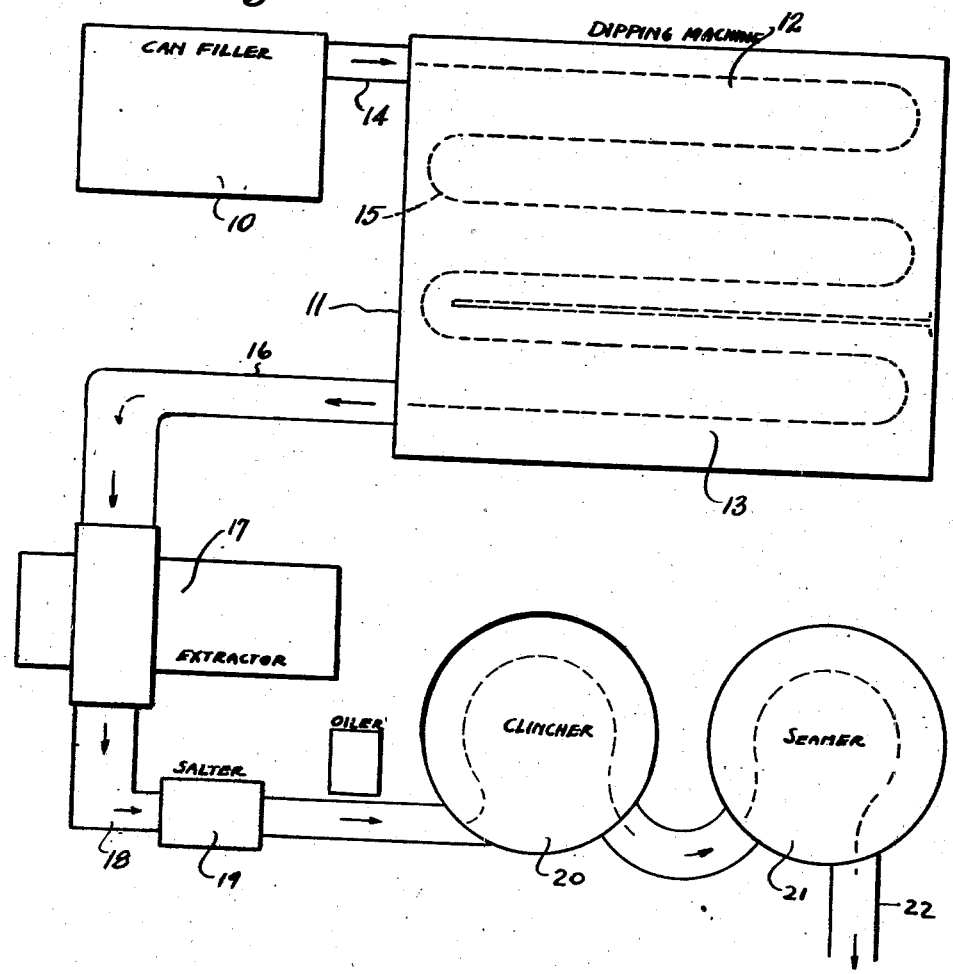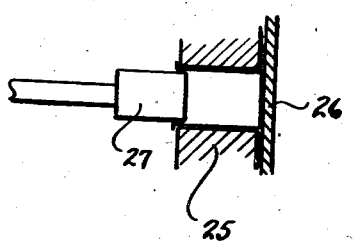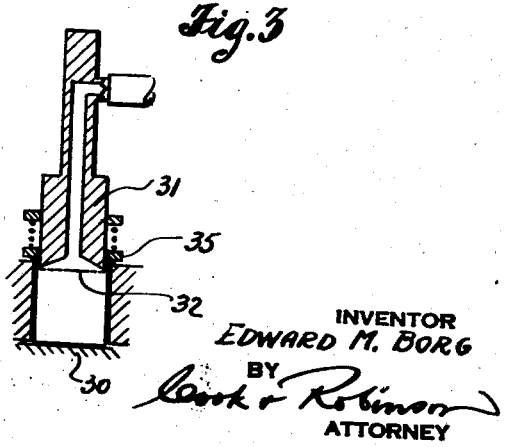

2,411,188

UNITED STATES PATENT OFFICE 2,411,188

METHOD OF PRESERVING FISH

Edward M. Borg, Seattle, Wash.

Application February 17, 1942, Serial No. 431,255

6 Claims. (Cl. 99—187)

This invention relates to the preserving and canning of fish and it has reference more particularly to improved methods for the canning of such fish as halibut, sole, cod and other fish which, to my knowledge, it has heretofore been impossible to preserve or can with any degree of success due to the fact that the texture of the meat and certain substances contained therein invariably cause the meat, after being canned, to either become mushy, discolored, rancid or of an obnoxious odor, to such extent that it is neither palatable nor desirable for human consumption.

The exact reasons, scientific or otherwise, for the deterioration, or discoloration of the product that is incident to its being canned, is not entirely clear to me beyond the fact that the objectionable results above mentioned apparently are due to the presence of certain substances comprised in the liquid content of the fish. I conclude this because of having quite satisfactorily demonstrated that when the liquid content of the meat, to a definite amount, is extracted prior to the product being hermetically sealed in the can, the canned meat will then remain palatable and exceptionally tasty, and will be very desirable for human consumption for an indefinitely extended period. Furthermore, it has been demonstrated that with proper seasoning prior to canning, the product will get more tasty and palatable as time goes on.

The objects of the present invention therefore are the following:

First, to provide an improved method, or process, for the preserving of fish, particularly fish such as halibut, whereby to overcome the possibilities of deterioration, discoloration or rancidity, and to improve the palatability and tastiness of the canned product.

Second, to provide a commercially practicable method of canning halibut, and other kinds of fish which, for substantially the same reasons as halibut, have heretofore been unsatisfactory in a canned condition.

More specifically stated, the objects of the present invention reside in the improved preservative treatment for halibut, and those other fish which heretofore could not for the same reasons be satisfactorily preserved, which comprises the extraction of liquid content from the meat, prior to freezing or the hermetic sealing of the product in containers. The process, in its more complete sequence of operations, or steps, includes an initial hot water treatment that prepares the meat for easy extraction of liquid content, and also includes a water cooling process, after the hot water treatment, and the subsequent displacement or extraction of the liquid by pressure that leaves the meat in a desirable degree of solidity.

It is also an object of this invention to insure against the dissipation of the desirable flavors and vitamins from the compressed meat after it has been sealed in vacuum in the can, by the filling of the can with a vegetable oil or other suitable liquid.

In accomplishing the above mentioned and other objects of the invention, I have provided the improved method, the various steps of which, and means for their accomplishment will hereinafter be described.

To better explain the present process, and its means of accomplishment, I have provided the accompanying drawing, wherein—

Fig. 1 diagrammatically illustrates an arrangement of machines, and the progression of the canned product through the various machines in the completion of the process.

Fig. 2 is a sectional detail, illustrating one means for the extraction of the liquid content from the fish as placed in a container.

Fig. 3 is a similar, sectional view of an alternative means for the extraction of liquid content.

It is quite well known in the fish canning industry that certain kinds of fish have not heretofore been considered desirable for canning, while others are desirable and are canned in great quantity. For example, the canning of salmon is an enormous industry, while halibut, cod, sole, dogfish and other fish abundant in quantity, are not now used or commercialized except in fresh or frozen state, uncanned. It is a generally accepted fact by fish canners that such fish as halibut, sole, sandabs and other similar fish which come under the general classification of "bottom fish," also some other fish, such as dogfish, because of the particular formation of the grain or texture of the meat layers, and by reason of certain liquid content thereof, are undesirable for canning by the ordinary processes such as now generally used for the successful canning of salmon.

In my experimentation with the canning of "bottom fish," of which halibut has been selected as typical insofar as the objects of this invention are concerned, I have observed that the canned meat becomes more watery or soggy as time goes on, and with the increase of sogginess, it becomes more undesirable for human consumption.

The present process also can be applied quite advantageously to the canning of tuna fish and greatly reduces the time and expense normally involved. Likewise, as above stated, it is applicable to dogfish and other fish which are not strictly classed as "bottom fish" or considered suitable for canning because of the after results.

Since I have demonstrated that the present process is quite effective for the canning of many kinds of fish, in the following specification, and in the claims terminating the specification, the use of the term "fish" is intended to designate and to apply to all fish, or the like, the meat of which contains those particular ingredients, or is of such structure as to make it undesirable for use after being canned by ordinary processes, but which can be canned and kept in a palatable and otherwise satisfactory state of preservation by the present methods of canning.

The method or process, in its present preferred sequence of steps or operations, as applied to the greatest number of different kinds of fish, is as follows:

First, the fresh fish is cleaned; then, as may be found necessary for ordinary canning, is cut into pieces of suitable size, then filled into the cans or containers in which it is finally to be hermetically sealed. Preferably, but not necessarily, the fish are skinned and boned, and that dark fatty substance sometimes found between the skin and meat, is discarded. The cans, ordinarily, are filled to the top with the prepared fish, and then the filled cans, with the top ends open, are passed through a dipping machine in which a treatment is given the meat whereby to facilitate the extraction or displacement of liquid content therefrom as heretofore mentioned.

The dipping machine may be of the type of any of those now commonly used in the canning industry. The typical dipping machine is formed with a reservoir, or compartment wherein a supply of water from 210° F. to 212° F. is maintained, and conveyors of suitable kind, for support of the cans in upright position, are employed therein for conveying the filled cans through the water while entirely immersed. The cans, and their fish content, are retained in this hot water for a period of approximately fifteen minutes, more or less, depending somewhat upon the particular kind of fish being treated, and are then removed therefrom by the conveyor.

It will here be explained that the above mentioned hot water treatment is not a cooking process, but is only intended to effect a certain tenderization of the tissues, which will allow the layers of meat to separate and the cell structure thereof to somewhat open up as a means of facilitating the subsequent step of extracting or displacing of that undesirable liquid content of the fish which renders it unsuitable for canning by ordinary methods.

From the foregoing hot water treatment, or dipping operation, the cans of fish are conveyed directly into a similar dipping machine, or what preferably comprises a separate compartment of the first machine, containing water at 50° F., for cooling the product. The cans are similarly conveyed while entirely immersed in the cooling water, for a period of from four to seven minutes, and are then carried out of the chamber to the means herein provided for the extraction of the excess water content from the fish.

It will here be mentioned that present-day methods of canning tuna fish are expensive and slow by reason of a certain pre-cooking treatment, generally believed to be necessary. The present method is well adapted to the canning of tuna fish and is like that for halibut up to the point described except that the hot water treatment is extended for approximately thirty minutes and the cooling treatment that follows may be eliminated.

Likewise, the method is made applicable to the successful canning and preservation of dogfish by the slight modification which comprises extending the period of heat treatment to approximately thirty minutes, or double that required for halibut and like fish.

For the removal or extraction of the water and particularly the undesirable liquid content, various types of machines or devices might be employed. The means now employed by me, and considered practical from the commercial standpoint, is a machine, slightly modified, made according to the machine of U. S. Patent No. 1,891,830, known as a can filler. In using this particular machine, or any similar machine for the present purpose of liquid displacement or extraction, the filled cans, with the top ends open as received from the dipping machine following the previously described heating and cooling treatments, are individually carried into the machine, each is received within a pocket of a rotary turret, and then reciprocating plungers, which, in the use of the machine as a can filler, operate to force meat into the cans, are caused, by a resetting or reforming of the original plunger actuating cam, to move to such additional extent that, in this particular use, they will enter the cans against the meat and will compress the latter, thus to force the desired amount of liquid content out from the meat. At present, for the canning of halibut, the original content of the full can is compressed to about seven-eighths its original volume, but this might be varied to a greater or lesser amount, depending upon the kind of fish being canned. The pressing, or extracting operation is relatively slow so that the liquid that is displaced will have sufficient time to drain from the can. Furthermore, the pressing action of the plunger so compresses the meat that it then has a desired degree of solidity.

Another method and means of extraction of liquid from the meat anticipates the use of a tubular plunger arranged to enter the open end of the can in a manner similar to the action of the plunger of the machine above described, and to be advanced against the contents of the can to the same extent. The end of such a tubular plunger would be substantially of the same diameter as the can. However, the end would be covered by a perforated plate or sheet of fine mesh. The outer end of the tubular plunger then preferably would have connection with a suction tube through which the water that is forced out of the meat by the advancement of the plunger into the can would be carried away.

Still another means of extracting the liquid anticipates use of a spinning machine on which the cans are placed for rotation to effect the displacement of liquid by centrifugal action.

After the extraction of liquid from and the compression of the meat, by any of the means as above recited, the cans of meat are passed to a salter, which may be any of the types now generally used in the canning industry, for the dropping of a specified amount of salt and/or other seasoning material into the open end of the can upon the compressed meat. Then it is a feature of this process that the can be filled to the maximum level in the head space as permitted for satisfactory sealing, with a suitable vegetable oil, or the like, to give additional flavor and palatability to the product. This liquid filling also prevents any possibility of the flavors and vitamins being extracted after sealing the can, that would result if any vacuum space was left in the container.

Finally, the top ends or closures are applied to the cans, and these, if of the usual kind, are clinched to the can bodies preparatory to sealing the can in vacuum.

Referring now more particularly to the drawing—

Fig. 1 diagrammatically shows a preferred and satisfactory arrangement of devices for practising the present method. In this view, 10 designates what may be any suitable type of filler for putting the cleaned fish in the cans. However, hand filling of cans might be employed if such should be necessary or found desirable. Numeral 11 designates, in its entirety, a combined dipping machine and cooler, divided into separate compartments 12 and 13, respectively, for the supply of hot water from 210° F. to 212° F. and that at 50° F. for cooling. Filled cans are delivered from the filling machine 10 through a guideway 14, and are picked up and conveyed through the dipping machine 11 by a travelling conveyor belt, indicated generally by reference numeral 15, and driven by any suitable means, not shown. Finally, the cans of fish are delivered from the machine 11, along a guideway 16 to the extractor device 17 for the withdrawal of free water and the undesirable liquid content from the fish. From the extractor, the cans, with the contents compressed therein, move along a guideway 18 to the salter 19, then to the clincher 20 and finally to the vacuum seamer 21, and are discharged from the latter through the chute 22. The oil that is added to fill the head space, may be poured in by hand or mechanically or by machine immediately after the salting operation. If it is not desired to use vegetable oil as the filler, then distilled water or other suitable substance may be employed.

In Fig. 2, I have shown a detail of a preferred arrangement of parts in the extractor device for elimination of liquid from the meat while in the cans. In this view, 25 designates a part of the can carrying turret of the extractor. 26 is a base plate against which the bottom end wall of the can is fitted during the extracting operation, and 27 designates a plunger that is operable toward the plate and against the contents of the can to compress the meat to the desired extent necessary for the displacement or extraction of the liquid. Clearance between the can wall and the plunger is provided as required for the escape of this liquid, but without loss of solid matter.

In Fig. 3, I have shown an alternative means for effecting the extraction of the water or liquid content from the meat. In this view, 30 designates a support for the can, 31 is a tubular plunger adapted to be projected downwardly into the can and covered at the end which enters the can, by a fine mesh plate 32. 33 designates a suction tube attached to the outer end of the plunger passage, whereby the water, or liquid that is pressed from the meat, may be withdrawn. The plunger in this instance, would be actuated by any suitable means, and a spring pressed collar 35 is here shown as being applied about the plunger so that when it is withdrawn from the can, the can will be retained against the base plate.

While I have described the present method as being carried out mainly by the use of machines, it is to be understood that all operations might be accomplished by hand; that is, manually, if such should be desired. In other words, the fish, after being cleaned, could be placed by hand in hot water for the desired heat treatment, then lifted out by hand and placed in the cooling bath. Next, they could be placed by hand in any suitable type of container and pressure applied thereagainst for effecting the displacement of the liquid content from the meat, and to compress the meat to the desired firmness. Finally, the meat could be placed in containers of any suitable kind, such as the well known mason jars, and hand sealed.

It is to be understood that the seasoning of the meat is only to render the product more palatible, and is not necessarily required for the preservation of the meat after it has been canned by this process. It is extremely desirable, however, that prior to sealing the can in vacuum, the head space of the can created by the step of liquid extraction, be filled with a suitable liquid such as vegetable oil.

It is to be understood further that the gist of the present invention resides in the novel process, or method of canning fish which preferably, but not necessarily, includes the initial heat treatment to loosen or open up the layers of meat for a better and easier extraction of the undesirable liquid content. Then, extraction, by compression or otherwise, of the undesirable liquid content, and the pressing of the meat. Finally the seasoning, filling the head space with oil, and then hermetic sealing of the meat in its container. This process applies especially to halibut, sole, sandabs, cod, and other "bottom fish," and as stated, has also been found satisfactory, as modified, for the canning of tuna and dogfish. Furthermore, by slight modification, well within the scope of the description, it is satisfactory for crab meat and abalone.

The various steps in the process might be modified to some extent, or some eliminated, dependent upon the particular type of fish being canned, but in a general way would be used in its entirety for all fish of this general classification.

In view of present-day development of refrigeration and sharp freezing apparatus, it is now practical to store the treated product unsealed in adequate cold storage, thus eliminating the final steps of hermetically sealing in cans. The product, however, when in cold storage, is packed in suitable containers or cartons.

Having thus described my invention, what I claim as new therein and desire to secure by Letters Patent is:

1. The method of preserving fish, comprising subjecting the cleaned fish to a hot water bath for an interval sufficient to cause loosening of the meat tissues and layers without cooking, subsequently effecting forced extraction of a substantial amount of the liquid content from the meat, and finally compressing the product in a container.

2. The method of canning fish, comprising subjecting the cleaned fish to a hot water bath at a temperature and time interval insufficient to effect cooking, but sufficient to cause loosening or slight separation of meat layers and tissues, then cooling the meat and subsequently forcibly extracting a substantial amount of the liquid content therefrom, and finally hermetically sealing the product in containers.

3. The method of canning fish, comprising immersing the cleaned fish in hot water, at a temperature of from 210° F. to 212° F. for a period sufficient to effect separation or loosening of the meat layers and tissues without cooking, cooling the product in a water bath, and subsequently, by compression, displacing therefrom a substantial proportion of the liquid content of the meat, and finally packing the product in containers.

4. The method of canning fish, comprising placing the cleaned fish in open cans, immersing the cans of fish in a hot water bath to cause slight loosening of the meat layers without cooking, then cooling the meat in a water bath, subsequently effecting displacement of free water from the cans and a forcible extraction of a substantial amount of the liquid content of the meat, and finally hermetically sealing the product in containers.

5. The method of canning fish, comprising placing the cleaned fish in open cans, conveying the cans of fish through a hot water bath at a temperature insufficient to effect cooking, and for a time interval sufficient to cause loosening of the meat layers and tissues, then conveying the open cans through a bath of cooling water, subsequently displacing the free water from the cans and extracting a substantial amount of the liquid content from the meat by compressing it in the cans, and finally hermetically sealing the product in containers.

6. The method of canning fish, comprising preparing and placing the fish in open end cans, then immersing the cans of cleaned fish in hot water, at a temperature of from 210° F. to 212° F. for a period sufficient to effect loosening of the meat layers without cooking, then conveying the open cans through a cooling bath of water at 50° F., and subsequently, by compression of the meat, displacing therefrom a substantial proportion of the liquid content of the meat, and finally filling the head space of the can with a sterile liquid for flavoring, and hermetically sealing the meat in the cans.

EDWARD M. BORG.